(12) United States Patent
Jung et al.

(10) Patent No.: US 12,303,083 B2
(45) Date of Patent: May 20, 2025

(54) MOBILE ROBOT AND METHOD FOR CONTROLLING SAME

(71) Applicant: EVERYBOT INC, Seongnam-si (KR)

(72) Inventors: Woo Chul Jung, Seongnam-si (KR); In Cheol Baek, Uiwang-si (KR)

(73) Assignee: EVERYBOT INC

( * ) Notice: Subject to any disclaimer, the term of this patent is extended or adjusted under 35 U.S.C. 154(b) by 197 days.

(21) Appl. No.: 17/787,634

(22) PCT Filed: Dec. 7, 2020

(86) PCT No.: PCT/KR2020/017781
§ 371 (c)(1),
(2) Date: Jun. 21, 2022

(87) PCT Pub. No.: WO2021/132939
PCT Pub. Date: Jul. 1, 2021

(65) Prior Publication Data
US 2022/0408997 A1 Dec. 29, 2022

(30) Foreign Application Priority Data
Dec. 24, 2019 (KR) .......................... 10-2019-0174358

(51) Int. Cl.
*A47L 11/40* (2006.01)
*A47L 9/28* (2006.01)

(52) U.S. Cl.
CPC ....... *A47L 11/4011* (2013.01); *A47L 11/4038* (2013.01); *A47L 11/4069* (2013.01); *A47L 9/28* (2013.01); *A47L 2201/04* (2013.01); *A47L 2201/06* (2013.01)

(58) Field of Classification Search
CPC ........ A47L 11/40; A47L 11/4011; A47L 9/28; A47L 9/2852; A47L 11/4083
See application file for complete search history.

(56) References Cited

U.S. PATENT DOCUMENTS

| 2011/0136418 A1* | 6/2011 | Weder ..................... B24B 47/12 451/353 |
| 2015/0142169 A1* | 5/2015 | Kim ..................... G05D 1/0238 15/98 |
| 2018/0028033 A1* | 2/2018 | Jung ..................... G05D 1/0011 |
| 2019/0014964 A1* | 1/2019 | Velasquez ............... A47L 9/242 |

(Continued)

FOREIGN PATENT DOCUMENTS

| JP | 2006-061285 A | 3/2006 |
| KR | 10-2018-0087778 A | 8/2018 |

(Continued)

*Primary Examiner* — Michael D Jennings
(74) *Attorney, Agent, or Firm* — Bridgeway IP Law Group, PLLC; Sang Ho Lee; Hyun Woo Shin (57) ABSTRACT

The present invention relates to a robot cleaner and a method for controlling the same. The present invention provides a mobile robot and a method for controlling the same, the mobile robot using the rotational force of three or more rotary members as a moving power source thereof, wherein the mobile robot is controlled to effectively travel along a configured straight travel route and not to deviate from the configured straight travel route, or is controlled to immediately return to the configured straight travel route when deviating from the configured straight travel route.

15 Claims, 9 Drawing Sheets

(56) References Cited

U.S. PATENT DOCUMENTS

| | | | | |
|---|---|---|---|---|
| 2019/0033869 A1* | 1/2019 | Herron | ................... | A47L 11/03 |
| 2019/0069744 A1* | 3/2019 | Liggett | ................ | A47L 9/2805 |
| 2019/0191950 A1* | 6/2019 | Luo | ...................... | A47L 11/283 |
| 2019/0298139 A1* | 10/2019 | Takaoka | ............... | A47L 9/2826 |

FOREIGN PATENT DOCUMENTS

| | | |
|---|---|---|
| KR | 10-2018-0092433 A | 8/2018 |
| KR | 10-1966083 B1 | 4/2019 |
| KR | 10-2019-0123882 A | 11/2019 |

\* cited by examiner

MOBILE ROBOT AND METHOD FOR CONTROLLING SAME

TECHNICAL FIELD

The present invention relates to a mobile robot, and more particularly, to a mobile robot traveling autonomously by including three or more rotary members, and a method for controlling the same.

BACKGROUND ART

Due to a recent technological development, there is not only a rapid development in technology of a mobile robot, but also very diverse utilizations and applications of the mobile robot. A representative example may be a robot cleaner which may perform cleaning while traveling autonomously without a user's manual operation.

A related market spotlights a robot cleaner which may use a rotational force of a rotary member to which a wet and/or dry cleaner (e.g., mop) is attached as its moving power source without wheels among various robot cleaners.

This robot cleaner may remove a foreign material or ingrained dirt adhered to a floor surface better than a robot cleaner traveling using wheels because this cleaner exerts more adhesive and frictional forces on the floor surface (i.e., surface to be cleaned).

However, the conventional robot cleaner using the rotational force of the rotary member may generally have two rotary members, and the floor surface existing between the two rotary members may be often excluded from its cleaning region.

Therefore, the conventional robot cleaner using the rotational force of the rotary members may have superior cleaning power than the robot cleaner traveling using wheels, and still have a technical limitation in guaranteeing perfect cleaning power.

A study has been conducted on a robot cleaner using three or more rotary members as a part of an effort to overcome the above technical limitation. For example, a robot mop cleaner is disclosed in Korean Patent No. 10-1966083 (application number: 10-2017-0156226).

However, as two rotary members are changed to three or more rotary members, it may be more difficult to control smooth travel of the mobile robot. Therefore, there is a constant need to control the mobile robot more precisely.

DISCLOSURE

Technical Problem

An object of the present invention is to provide a mobile robot using rotational forces of three or more rotary members as its moving power sources to travel smoothly along a configured travel route, and a method for controlling the same.

Another object of the present invention is to provide a mobile robot including three or more rotary members and capable of effectively controlling the three or more rotary members to travel a configured straight travel route when performing straight travel, and a method for controlling the same.

Yet another object of the present invention is to provide a mobile robot including three or more rotary members and capable of effectively controlling the three or more rotary members to return to a configured straight travel route or not to deviate from the straight travel route in a case where the mobile robot deviates from the configured straight travel route when performing a straight travel, and a method for controlling the same.

Still another object of the present invention is to provide a mobile robot having various technical means to maintain the above-mentioned straight travel route, and a method for controlling the same.

Technical Solution

In one general aspect, a mobile robot includes: a main body; a driving unit installed on the main body and supplying power for travel of the mobile robot; a first rotary member, a second rotary member and a third rotary member, capable of accommodating respective cleaners and providing moving power sources for the travel of the mobile robot by performing respective rotational motions about a first rotation axis, a second rotation axis and a third rotation axis by power of the driving unit; and a control unit controlling the driving unit for the first rotary member and the second rotary member to rotate at the same speed in opposite directions and for the third rotary member to rotate in the same direction as any one of a rotation direction of the first rotary member and a rotation direction of the second rotary member, wherein the first rotation axis corresponding to the first rotary member and the second rotation axis corresponding to the second rotary member are each inclined to have a predetermined angle with respect to a central axis, corresponding to a vertical axis of the mobile robot, for the first rotary member and the second rotary member to each have an angle with the ground, and the third rotation axis corresponding to the third rotary member is parallel to the central axis for the third rotary member to be parallel to the ground.

In addition, the first, second and third rotation axes may be formed for the first, second and third rotary members to be disposed adjacent to one another.

In addition, the control unit may control the driving unit for the third rotary member rotating at a third rotational speed to rotate at a speed equal to or lower than that of the first rotary member rotating at a first rotational speed or that of the second rotary member rotating at a second rotational speed, and for the third rotational speed to have a value of 10% or more of the first rotational speed or the second rotational speed.

In addition, the control unit may control at least one of the first rotational speed and the second rotational speed for the mobile robot to maintain a straight route in a case where the mobile robot deviates from the straight route during the travel of the mobile robot.

In addition, the mobile robot may further include a detection unit capable of detecting a travel direction of the mobile robot or whether the mobile robot performs a straight travel.

Here, the control unit may control any one of the first rotational speed and the second rotational speed for the mobile robot performs the straight travel based on a signal of the detection unit in the case where the travel direction of the mobile robot deviates from the straight route.

In addition, the detection unit may include at least one of an acceleration sensor and a gyro sensor.

In addition, the control unit may control at least one of the first rotational speed, the second rotational speed and the third rotational speed in consideration of at least one of a friction level of a floor surface on which the mobile robot travels and whether the cleaner is wet or dry during the travel of the mobile robot.

In addition, the control unit may determine the friction levels of the floor surface corresponding to the first rotary member and the floor surface corresponding to the second rotary member by obtaining a first load value applied to the first rotary member and a second load value applied to the second rotary member.

In addition, the control unit may control at least one of the first rotational speed and the second rotational speed in consideration of the first load value and the second load value for the mobile robot to travel along a straight route.

In addition, the control unit may determine whether the cleaner is wet or dry by any one of a signal received from an external remote controller and detection of a predetermined color corresponding to each of the wet cleaner and the dry cleaner.

In another general aspect of the present invention, a method for controlling a mobile robot using rotational forces of a plurality of rotary members as moving power sources for its travel, includes: allowing a mobile robot to travel by rotating at least one of a first rotary member, a second rotary member and a third rotary member, capable of accommodating respective cleaners and performing respective rotational motions about a first rotation axis, a second rotation axis and a third rotation axis; and controlling the first, second and third rotary members for the first rotary member and the second rotary member to rotate at the same speed in opposite directions and for the third rotary member to rotate in the same direction as any one of a rotation direction of the first rotary member and a rotation direction of the second rotary member, wherein the first rotation axis corresponding to the first rotary member and the second rotation axis corresponding to the second rotary member are each inclined to have a predetermined angle with respect to a central axis, corresponding to a vertical axis of the mobile robot, for the first rotary member and the second rotary member to each have an angle with the ground, and the third rotation axis corresponding to the third rotary member is parallel to the central axis for the third rotary member to be parallel to the ground.

In addition, the first, second and third rotary members may be disposed adjacent to one another.

In addition, the controlling may include controlling at least one of the first, second and third rotary members for the third rotary member rotating at a third rotational speed to rotate at a speed equal to or lower than that of the first rotary member rotating at a first rotational speed or that of the second rotary member rotating at a second rotational speed, and for the third rotational speed to have a value of 10% or more of the first rotational speed or the second rotational speed.

In addition, the method for controlling a mobile robot may further include controlling at least one of the first rotational speed and the second rotational speed for the mobile robot to maintain a straight route in a case where the mobile robot deviates from the straight route during the travel of the mobile robot.

In addition, the method for controlling a mobile robot may further include: obtaining a first load value applied to the first rotary member and a second load value applied to the second rotary member during the travel of the mobile robot; and controlling at least one of the first rotational speed and the second rotational speed for the mobile robot to maintain a straight route in a case where a difference between the first load value and the second load value is greater than a predetermined value.

In addition, the controlling may include controlling at least one of the first rotational speed, the second rotational speed and the third rotational speed in consideration of at least one of a friction level of a floor surface on which the mobile robot travels and whether the cleaner is wet or dry during the travel of the mobile robot.

In yet another general aspect, a computer program stored in a medium may be provided to execute the method of the present invention.

In still another general aspect, a distribution server for distributing the computer program stored in a medium may be provided to execute the method of the present invention.

Advantageous Effects

The mobile robot and the method for controlling the same according to the present invention may provide the following effects.

According to the present invention, the mobile robot using the rotational forces of three or more rotary members as its moving power sources may travel smoothly along the configured travel route.

In addition, according to the present invention, the mobile robot may travel effectively along the configured straight travel route when performing the straight travel by including at least three rotary members.

In addition, according to the present invention, the mobile robot including three or more rotary members may return to the configured straight travel route or not to deviate from the straight travel route in the case where the robot deviates from or is about to deviate from the configured straight travel route when performing the straight travel.

In addition, according to the present invention, the mobile robot including three or more rotary members may have various technical means to maintain the above-mentioned straight travel route, and may thus travel the configured straight travel route efficiently and effectively.

However, the scope of the present invention is not limited to the above-described effects.

DESCRIPTION OF DRAWINGS

FIG. 7 is a view showing travel of the mobile robot moving forward along a straight route according to an embodiment of the present invention.

BEST MODE

Information on the operational effect and technical configuration of a mobile robot and a method for controlling the same according to the present invention to achieve the above objects will be clearly understood by the following detailed description with reference to the drawings showing preferred embodiments of the present invention.

The following merely exemplifies a principle of the present invention. Therefore, those skilled in the art may implement the principle of the present invention and invent various devices included in the spirit and scope of the present invention although not clearly described or shown in the present specification. In addition, it is to be understood that all conditional terms and embodiments mentioned in the present specification are obviously intended only to assist in understanding a concept of the present invention in principle, and the present invention is not limited to embodiments and states particularly mentioned as such.

Further, it is to be understood that all detailed descriptions mentioning specific embodiments of the present invention as well as principles, aspects, and embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Further, when it is determined that a detailed description of the known art related to the present invention may obscure the gist of the present invention, the detailed description thereof will be omitted. Additionally, components in the drawings are not necessarily drawn to scale. For example, sizes of some of the components in the drawings may be exaggerated as compared with other components in order to assist in the understanding of embodiments of the present invention. In addition, the same reference numerals in different drawings denote the same components, and similar reference numerals denote similar components, although not necessarily.

Therefore, it is to be understood that, for example, block diagrams of the present specification illustrate a conceptual aspect of an illustrative circuit for embodying the principle of the present invention. Similarly, it is to be understood that all flow charts, state transition diagrams, pseudo-codes and the like illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the drawings may be provided using hardware having capability to execute appropriate software as well as dedicated hardware. When provided by the processors, the functions may be provided by a single dedicated processor, a single shared processor or a plurality of individual processors, and some of the processors may be shared with each other.

Further, explicit use of terms presented as processors, controls, or similar concepts should not be construed as exclusively referring to hardware capable of executing software, and may implicitly include, without limitation, digital signal processor (DSP) hardware, a read-only memory (ROM), a random access memory (RAM) and a non-volatile memory, for storing the software. The above-mentioned terms may also include well-known other hardware.

In the claims of the present specification, components represented as means for performing functions mentioned in the detailed description are intended to include all methods for performing functions including all types of software including, for example, a combination of circuit elements performing these functions, firmware/micro codes or the like, and are coupled to appropriate circuits for executing the software so as to execute these functions. It is to be understood that functions provided by variously mentioned means are combined with each other and are combined with a method demanded by the claims in the present invention defined by the claims, and any means capable of providing these functions are thus equivalent to means recognized from the present specification.

The above-mentioned objects, features and advantages will become more obvious from the following detailed description associated with the accompanying drawings. Therefore, those skilled in the art to which the present invention pertains may easily practice a technical idea of the present invention.

Hereinafter, various embodiments according to the technical idea of the present invention will be described in detail with reference to the accompanying drawings.

The present specification mainly describes a robot cleaner as an example of the mobile robot to which the present invention is applied. However, it is obvious that the mobile robot to which the present invention is applied is not limited to the robot cleaner.

Figure 1:
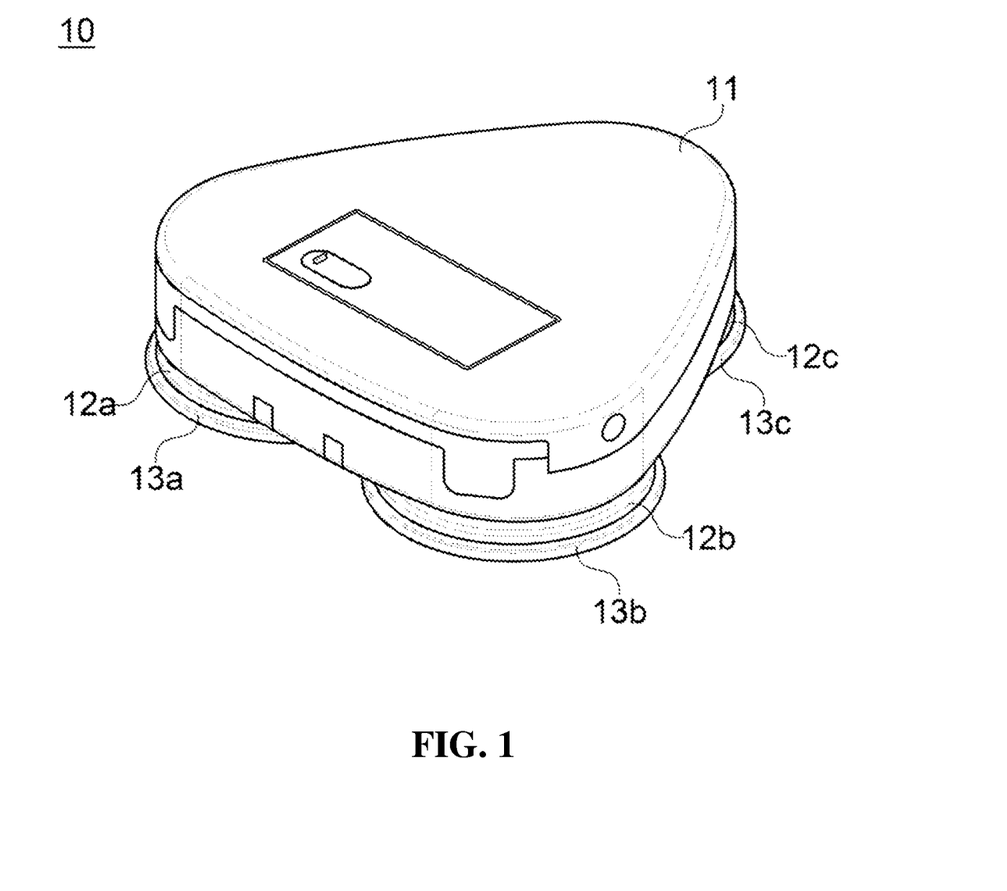
FIG. 1 is a view showing an exterior of a robot cleaner as an example of a mobile robot to which the present invention is applied.
Figure 2:
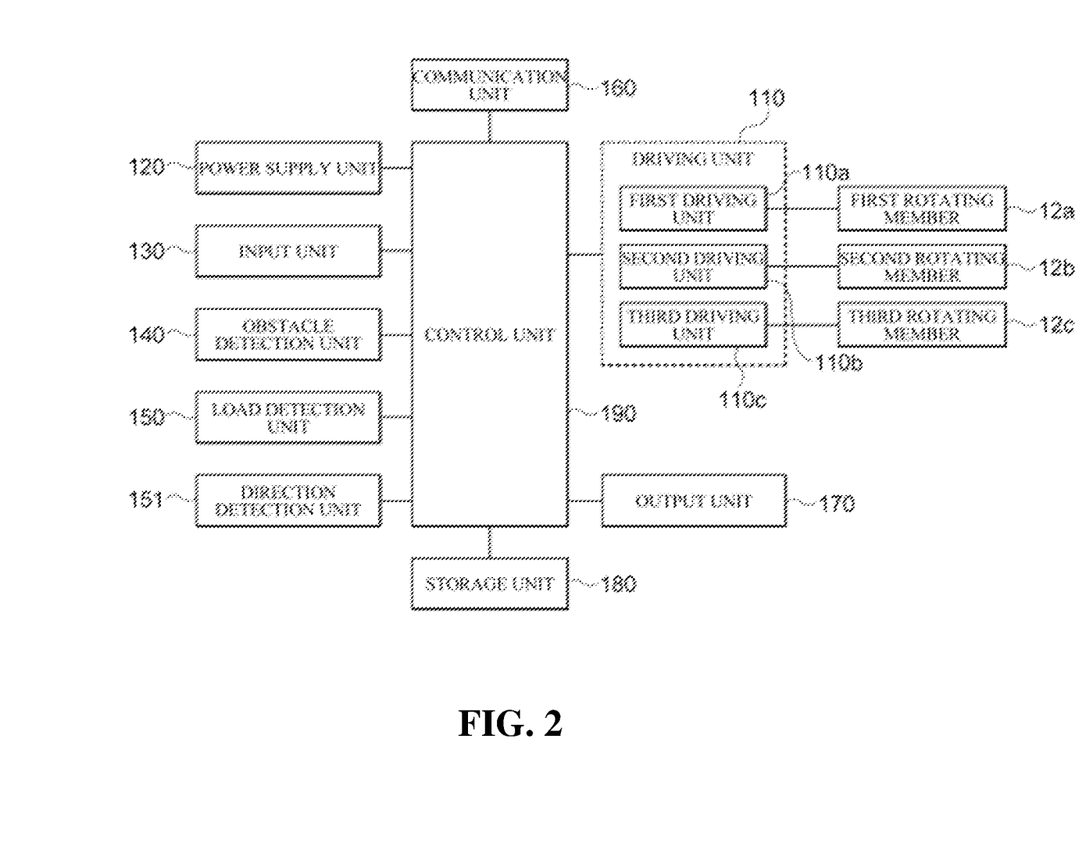
FIG. 2 is a block diagram of the mobile robot according to an embodiment of the present invention.

FIG. 1 is a view showing an exterior of a robot cleaner as an example of a mobile robot to which the present invention is applied; and FIG. 2 is a block diagram of the mobile robot according to an embodiment of the present invention.

Referring to FIGS. 1 and 2, a mobile robot 10 according to an embodiment of the present invention may include a main body 11 forming an exterior of the mobile robot 10, a driving unit 110 installed on the main body 11 and supplying power for travel of the mobile robot 10, a first rotary member 12a, a second rotary member 12b and a third rotary member 12c, coupled to the driving unit 110 to perform respective rotational motions, and a power supply unit 120 installed in the main body 11.

The mobile robot 10 according to an embodiment of the present invention may travel while performing dry or wet cleaning by using a first cleaner 13a, a second cleaner 13b and a third cleaner 13c.

Here, the cleaning may refer to an operation of wiping a surface to be cleaned using the cleaners 13a, 13b and 13c. The dry cleaning may include cleaning using a dry rag or the like and the wet cleaning may include cleaning using a rag wet with liquid.

The first cleaner 13a, the second cleaner 13b and the third cleaner 13c may respectively be accommodated in the first rotary member 12a, the second rotary member 12b and the third rotary member 12c.

The first cleaner 13a, the second cleaner 13b and the third cleaner 13c may respectively be detachably attached to the first rotary member 12a, the second rotary member 12b and the third rotary member 12c.

The first, second and third rotary members 12a, 12b and 12c may be disposed adjacent to each other, and a triangle may be formed when connecting respective center points of the first, second and third rotary members 12a, 12b and 12c one another.

The driving unit 110 may include a first driving unit 110a installed in the main body 11 and coupled to the first rotary member 12a, a second driving unit 110b installed in the main body 11 and coupled to the second rotary member 12b, and a third driving unit 110c installed in the main body 11 and coupled to the third rotary member 12c.

Figure 3:
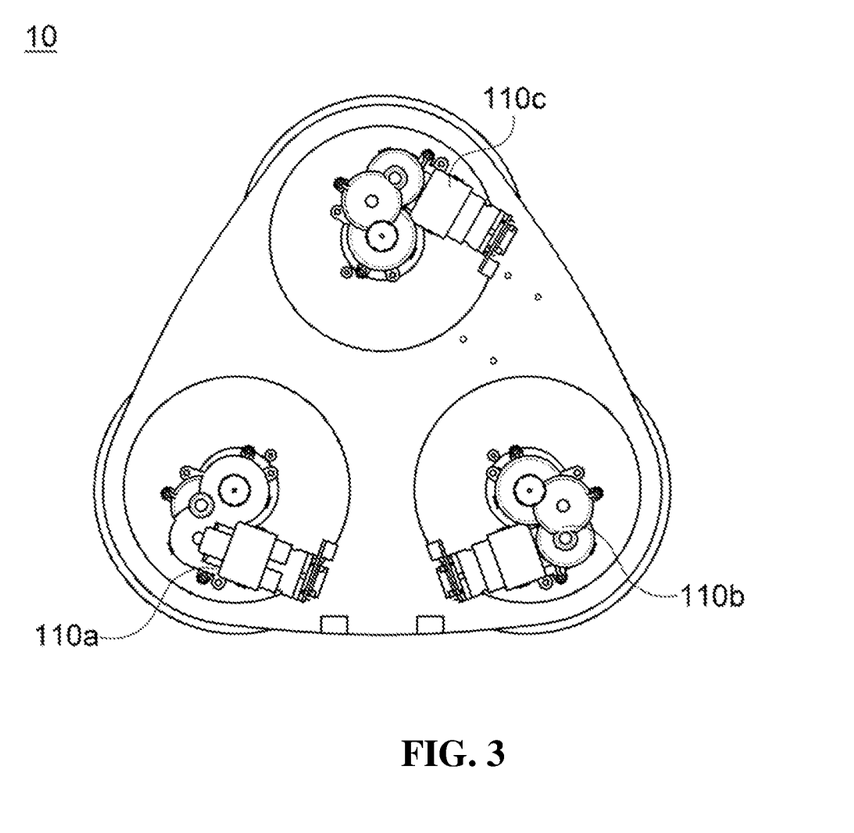
FIG. 3 is a view showing an example of a driving unit.

In addition, the driving unit 110 may be implemented including a motor, a gear assembly and the like. FIG. 3 is a view showing an example of the driving unit.

The first rotary member 12a may be coupled to the first driving unit 110a and include a first transmitting member (not shown) transmitting power of the first driving unit 110a and performing the rotational motion about a first rotation axis by the power, and a first fixing member (not shown) to which the first cleaner 13a may be fixed.

In addition, the second rotary member 12b may include a second transmitting member (not shown) coupled to the second driving unit 110b to transmit power of the second driving unit 110b and performing the rotational motion about a second rotation axis by the power, and a second fixing member (not shown) to which the second cleaner 13b may be fixed.

In addition, the third rotary member 12c may include a third transmitting member (not shown) coupled to the third driving unit 110c to transmit power of the third driving unit 110c and performing the rotational motion about a third rotation axis by the power, and a third fixing member (not shown) to which the third cleaner 13c may be fixed.

The first cleaner 13a, the second cleaner 13b and the third cleaner (13c) may be made of a fibrous material such as a cloth capable of wiping various surfaces to be cleaned, for example, a micro-fiber cloth, a rag, a non-woven fabric or a brush, in order to remove a foreign material adhered to a floor surface by performing the rotational motion.

In addition, the first cleaner 13a, the second cleaner 13b and the third cleaner 13c may each have a circular shape, and may be implemented in various shapes without limitation in shape.

The mobile robot 10 according to an embodiment of the present invention may remove the foreign material adhered to the floor through friction with the surface to be cleaned as the cleaners 13a, 13b and 13c rotate by the rotational motions of the first, second and third rotary members 12a, 12b and 12c. In addition, when a frictional force is generated between the cleaners 13a, 13b and 13c and the surface to be cleaned, the frictional force may be used as a moving power source of the mobile robot 10.

For example, in the mobile robot 10 according to an embodiment of the present invention, as the first, second and third rotary members 12a, 12b and 12c rotate, the frictional force may be generated between the cleaners 13a, 13b and 13c and the surface to be cleaned, and the travel speed and travel direction of the mobile robot 10 may be determined based on the magnitude and direction of its resultant force.

In addition, for example, in the mobile robot 10 according to an embodiment of the present invention, as the first and second rotary members 12a and 12b rotate, the frictional force may be generated between the cleaners 13a and 13b and the surface to be cleaned, and the travel speed and travel direction of the mobile robot 10 may be determined based on the magnitude and direction of its resultant force.

Here, rotations of the first and second rotary members 12a and 12b may determine the travel speed and travel direction of the mobile robot 10, and rotation of the third rotary member 12c may act as a supplement without affecting the travel speed and travel direction of the mobile robot 10 based on its speed.

Referring to FIG. 2, the mobile robot 10 according to an embodiment of the present invention may include the driving unit 110, the rotary members 12a, 12b and 12c, the power supply unit 120, an input unit 130, an obstacle detection unit 140, a load detection unit 150, a direction detection unit 151, a communication unit 160, an output unit 170, a storage unit 180 and a control unit 190.

The power supply unit 120 may supply power to the mobile robot 10. In detail, the power supply unit 120 may supply power to each functional unit included in the mobile robot 10, and may be charged by receiving a charging current when a remaining amount of power is insufficient. Here, the power supply unit 120 may be implemented as a rechargeable battery.

The input unit 130 may receive a user input for operating the mobile robot 10. In particular, the input unit 130 may receive a user input for selecting a cleaning mode of the mobile robot 10. Here, the cleaning mode may include an intensive cleaning mode for intensively cleaning a surrounding space based on a current position of the mobile robot 10, a wall-along cleaning mode for performing the cleaning while traveling along a wall, a manual cleaning mode for performing the cleaning while traveling in a direction corresponding to a user direction-key input value, an S-shaped cleaning mode for performing the cleaning while traveling in an S-shaped pattern, a Y-shaped cleaning mode for performing the cleaning while traveling in a Y-shaped pattern, a straight cleaning mode for performing the cleaning while traveling in a straight line, an automatic cleaning mode for performing the cleaning by automatically selecting a cleaning mode suitable for a travel situation of the mobile robot 10 among the plurality of cleaning modes, etc.

The obstacle detection unit 140 may detect various objects and obstacles, such as a fixed object such as furniture, a wall or a structure, or a moving object such as a person or an animal. The obstacle detection unit 140 may be implemented as various means such as an infrared sensor, a laser, a collision detection means or the like.

In addition, the obstacle detection unit 140 implemented as the various means described above may detect various obstacles that interfere with the travel of the mobile robot 10, such as low obstacles such as thresholds and carpets, obstacles floating above a certain height such as sofas or beds, high obstacles such as walls, and obstacles such as falling points.

The load detection unit 150 may obtain a load value each applied to the first, second and third rotary members 12a, 12b and 12c. In detail, the load detection unit 150 may obtain the load value each applied to the first, second and third rotary members 12a, 12b and 12c by using a load current applied to a motor.

For example, the load detection unit 150 may detect the load each applied to the first, second and third rotary members 12a, 12b and 12c based on the travel of the mobile robot 10.

For example, during the travel of the mobile robot 10, a large load may occur in the first rotary member 12a to which the first cleaner 13a is attached when the first cleaner 13a comes into contact with a foreign material such as ingrained dirt positioned on the surface to be cleaned or water.

For another example, during the travel of the mobile robot 10, a large load may occur in the second rotary member 12b to which the second cleaner 13b is attached when the second cleaner 13b comes into contact with the foreign material such as the ingrained dirt positioned on the surface to be cleaned or water.

That is, in order to respond to various environments of the surface to be cleaned, which may occur during the travel of the mobile robot 10, the load detection unit 150 may detect the load each applied to the first, second and third rotary members 12a, 12b and 12c based on the travel of the mobile robot 10.

The load detection unit 150 may include a first load detection unit obtaining a first load value applied to the first rotary member 12a, a second load detection unit obtaining a second load value applied to the second rotary member 12b, and a third load detection unit obtaining a third load value applied to the third rotary member 12c.

Here, the first load value may be a load current value of a first motor providing a driving force for driving the first rotary member 12a, the second load value may be a load current value of a second motor providing a driving force for driving the second rotary member 12b, and the third load value may be a load current value of a third motor providing a driving force for driving the third rotary member 12c. That is, the load detection unit 150 may be implemented as a means for detecting the load current value of the motor.

However, this configuration is only an embodiment of the present invention, and the load detection unit 150 may calculate the above-described load value by using data other than the load current value applied to the motor.

In more detail, according to another embodiment of the present invention, the load detection unit 150 may calculate the above-described load value by comparing a difference between rotational speeds of the first and second rotary members 12a and 12b, requested based on a control signal of the control unit 190, and actually-output rotational speeds of the first and second rotary members 12a and 12b.

The direction detection unit 151 may detect the travel direction of the mobile robot 10, a travel angle of the mobile robot 10, whether the mobile robot 10 performs a straight travel, etc. In more detail, the direction detection unit 151 may be implemented as a three-axis acceleration sensor or a six-axis sensor (i.e. a three-axis acceleration and three-axis gyro sensor), and is not limited thereto.

Here, the travel angle of the mobile robot 10 may indicate an angle formed when the mobile robot 10 travels along a curved route such as forward left, forward right, backward left or backward right.

In addition, straight travel of the mobile robot 10 may include forward travel along a straight route and backward travel along the straight route.

The communication unit 160 may include at least one module that enables wireless communication between the mobile robot 10 and another wireless terminal or between the mobile robot 10 and a network in which another wireless terminal is positioned. For example, the communicating unit 160 may communicate with the wireless terminal, which is a remote controller, and may include a short-range communication module or a wireless internet module, for this purpose.

The output unit 170 is to generate an output related to a visual sense, an auditory sense or the like, and may include a display unit, a sound output module, an alarm unit or the like, although not shown in the drawings.

The storage unit 180 may store a program for an operation of the control unit 190, and temporarily store input/out data. The storage unit 160 may include at least one of a flash memory type storage medium, a hard disk type storage medium, a multimedia card micro type storage medium, a card type memory (for example, a secure digital (SD) or extreme Digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk.

The control unit 190 may control an overall operation of the mobile robot 10 according to an embodiment of the present invention, and manage a flow of information or data between respective components.

Accordingly, in terms of hardware, the control unit 190 may include at least one processor including a central processing unit (CPU)/micro processing unit (MPU) and an execution memory (e.g., a register and/or the random access memory (RAM), and a bus (or internal cable) for inputting and outputting predetermined data.

In addition, in terms of software, the control unit 190 may include a predetermined program routine and/or program data loaded into the execution memory from a predetermined recording medium and processed by the processor to perform various operations and functions of the mobile robot 10 according to an embodiment of the present invention.

In addition, for example, in more detail, the control unit 190 may control all or part of the driving unit 110, the rotary members 12a, 12b and 12c, the power supply unit 120, the input unit 130, the obstacle detection unit 140, the load detection unit 150, the direction detection unit 151, the communication unit 160, the output unit 170 and the storage unit 180.

Meanwhile, although not shown in the drawings, the mobile robot 10 according to an embodiment of the present invention may include a water supply unit for supplying a liquid (e.g., water or washing liquid) to at least one of the first, second and third cleaners 13a, 13b and 13c.

The control unit 190 may supply liquid to at least one of the first, second and third cleaners 13a, 13b and 13c by controlling the water supply unit.

The mobile robot 10 according to an embodiment of the present invention may perform the wet cleaning by using at least one of the first, second and third cleaners 13a, 13b and 13c, to which liquid is supplied from the water supply unit.

In addition, the mobile robot 10 according to an embodiment of the present invention may perform the dry cleaning by using the other of the first, second and third cleaners 13a, 13b and 13c, to which liquid is not supplied.

The mobile robot 10 according to an embodiment of the present invention may also perform the dry cleaning in a case where liquid is supplied to none of the first, second and third cleaners 13a, 13b and 13c.

Figure 4:
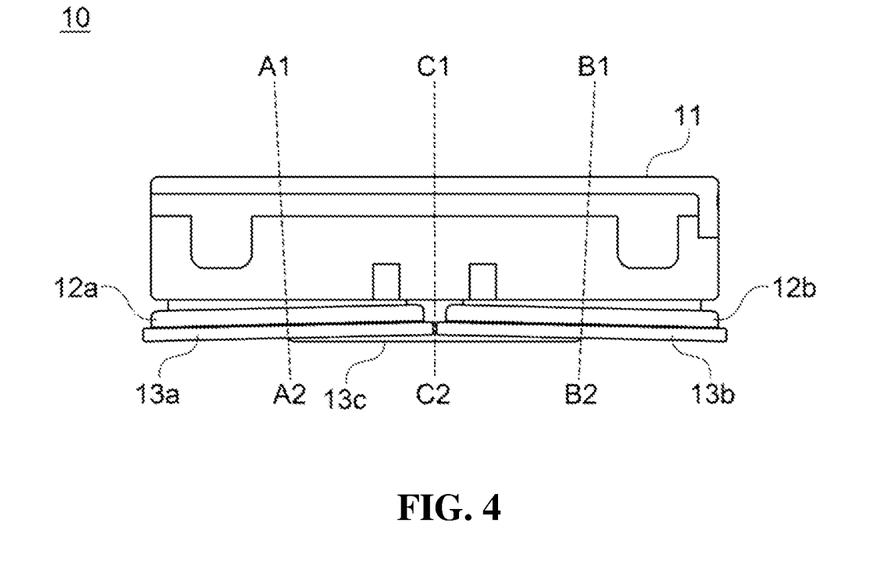
FIG. 4 is a front view of the mobile robot according to an embodiment of the present invention.
Figure 5:
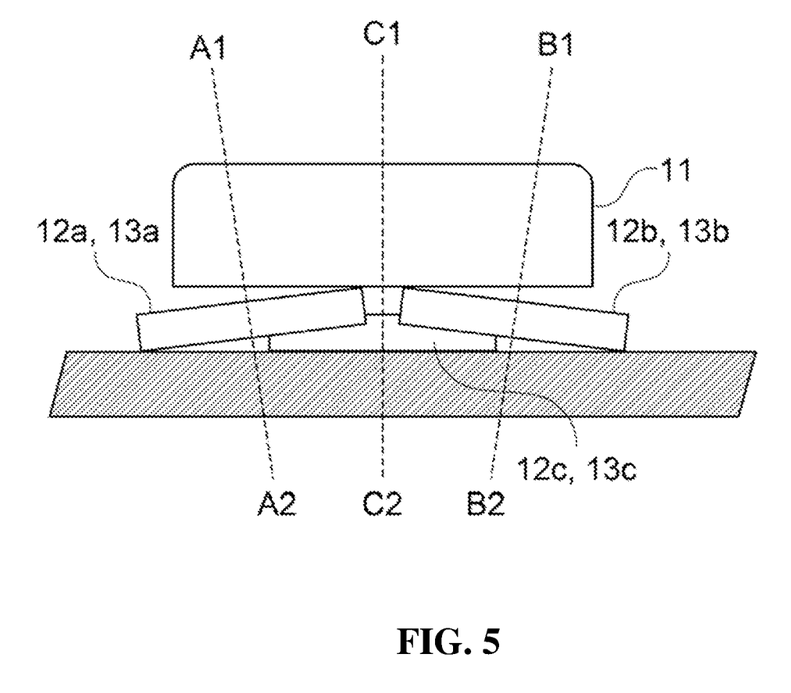
FIG. 5 is a cross-sectional view of the mobile robot according to an embodiment of the present invention.

FIG. 4 is a front view of the mobile robot according to an embodiment of the present invention; and FIG. 5 is a cross-sectional view of the mobile robot according to an embodiment of the present invention.

Referring to FIGS. 4 and 5, a first rotation axis A1-A2 and a second rotation axis B1-B2, respectively corresponding to the first and second rotary members 12a and 12b, which may determine the travel speed and travel direction of the mobile robot 10 according to an embodiment of the present invention, may each be inclined to have a predetermined angle with respect to a central axis corresponding to a vertical axis of the mobile robot 10.

In this case, the first and second rotary members 12a and 12b, as shown in FIGS. 4 and 5, may each be inclined downwardly outward with respect to the central axis to have a predetermined angle with the ground (i.e., the surface to be cleaned).

Here, a region positioned far from the central axis among regions of the first cleaner 13a and the second cleaner 13b, respectively fixed to the first and second rotary members 12a and 12b, may be strongly adhered to the surface to be cleaned than a region positioned closer to the central axis.

That is, when the first and second rotary members 12a and 12b rotate, the relative frictional force generated between the surface to be cleaned and the first and second cleaners 13a and 13b may be larger at outskirts than at a center of the main body 11.

Here, the central axis corresponding to the vertical axis of the mobile robot 10 may indicate a vertical axis with respect to the surface to be cleaned of the mobile robot 10.

For example, under the assumption that the mobile robot 10 performs the cleaning while traveling an X-Y plane formed by X and Y axes during a cleaning operation, the central axis may indicate a Z axis, which is the vertical axis with respect to the surface to be cleaned.

In addition, the predetermined angle may include a first angle (degree "a") corresponding to an angle at which the first rotation axis A1-A2 is inclined with respect to the central axis and a second angle (degree "b") corresponding to an angle at which the second rotation axis B1-B2 is inclined with respect to the central axis. Here, the first angle and the second angle may be the same as or different from each other.

Meanwhile, referring to FIGS. 4 and 5, a third rotation axis C1-C2 corresponding to the third rotary member 12c acting as a supplementary factor for the travel speed and travel direction of the mobile robot 10 according to an embodiment of the present invention may be parallel to the central axis corresponding to the vertical axis of the mobile robot 10, and the third rotary member 12c may thus be parallel to the ground (i.e., the surface to be cleaned).

Figure 6:
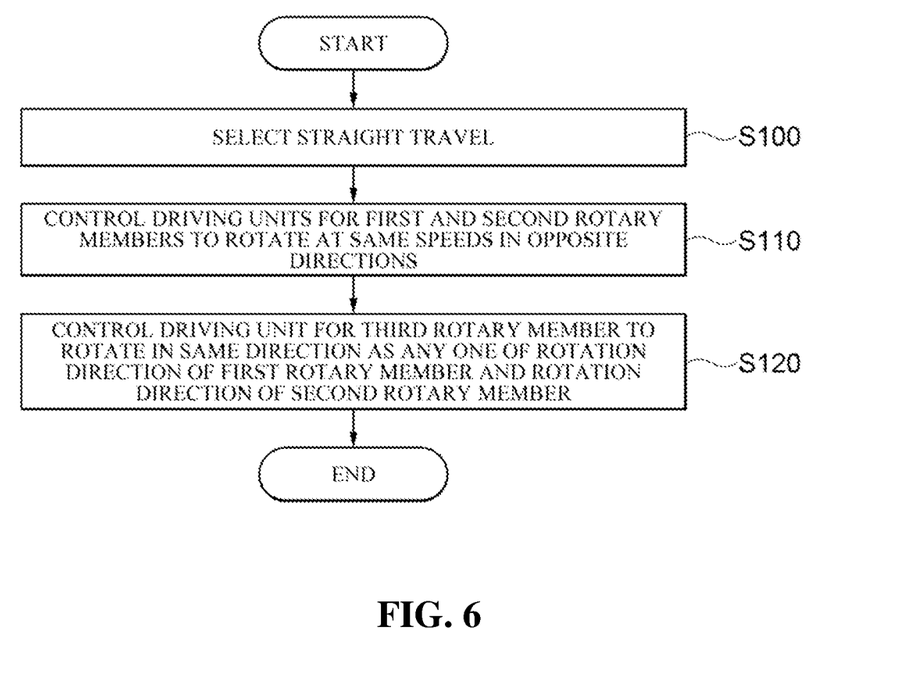
FIG. 6 is a flowchart showing a method for controlling a mobile robot according to another embodiment of the present invention.

FIG. 6 is a flowchart showing a method for controlling a mobile robot according to another embodiment of the present invention. The method for controlling a mobile robot according to another embodiment of the present invention may be implemented in the mobile robot 10 according to an embodiment of the present invention described with reference to FIGS. 1 to 5. Hereinafter, the description describes the method for controlling a mobile robot according to another embodiment of the present invention and an operation of the mobile robot 10 for implementing the method in detail with reference to the necessary drawings.

Referring to FIG. 6, the control unit 190 may select straight travel that the mobile robot 10 travels along a straight route [S100]. For example, a user may input a command for the mobile robot 10 to travel along the straight route by using a remote controller (not shown). In addition, for example, the control unit 190 may select a cleaning mode including a mode in which the mobile robot travels along the straight route among various cleaning modes by the user or by a preset algorithm.

The straight travel may include the forward travel along the straight route and the backward travel along the straight route.

The control unit 190 may control the first and second driving units 110a and 110b for the first and second rotary members 12a and 12b to rotate at the same speed in opposite directions, based on a selection of the straight travel in step S100 [S110].

In addition, the control unit 190 may control the third driving unit 110c for the third rotary member 12c to rotate in the same direction as any one of a rotation direction of the first rotary member 12a and a rotation direction of the second rotary member 12b [S120].

Here, the controller 190 may control the driving unit 110 for the third rotary member 12c rotating at a third rotational speed to rotate at a speed equal to or lower than that of the first rotary member 12a rotating at a first rotational speed or that of the second rotary member 12b rotating at a second rotational speed.

In addition, the control unit 190 may control the driving unit 110 for the third rotational speed to have a value of 10% or more of the first rotational speed or the second rotational speed.

The third rotational speed may preferably have a value of 30% or more of the first rotational speed or the second rotational speed.

Meanwhile, for example, when the load on the floor surface is not higher than a preset reference, the third rotational speed may have a value in a range of 50% to 80% of the first rotational speed or second rotational speed.

In addition, for example, when the load on the floor surface is higher than the preset reference, the third rotational speed may have a value in a range of 50% to 100% of the first rotational speed or second rotational speed.

In addition, for example, when the mobile robot 10 performs the wet cleaning as described above, the third rotational speed may have the value in a range of 50% to 100% of the first rotational speed or second rotational speed.

In addition, for example, when the mobile robot 10 performs the dry cleaning as described above, the third rotational speed may have the value of 30% or more of the first rotational speed or second rotational speed.

In this way, the control unit 190 may consider at least one of the load on the floor surface (i.e., a friction level of the floor surface) and whether the cleaner is wet or dry to determine a relative level of the third rotational speed with respect to the first rotational speed and the first rotational speed.

The relative level of the third rotational speed, based on at least one of the load of the floor surface and whether the cleaner is wet or dry, may be stored in the storage unit 180 as a preset table or algorithm, and invoked by the control unit 190 when necessary.

Figure 8:
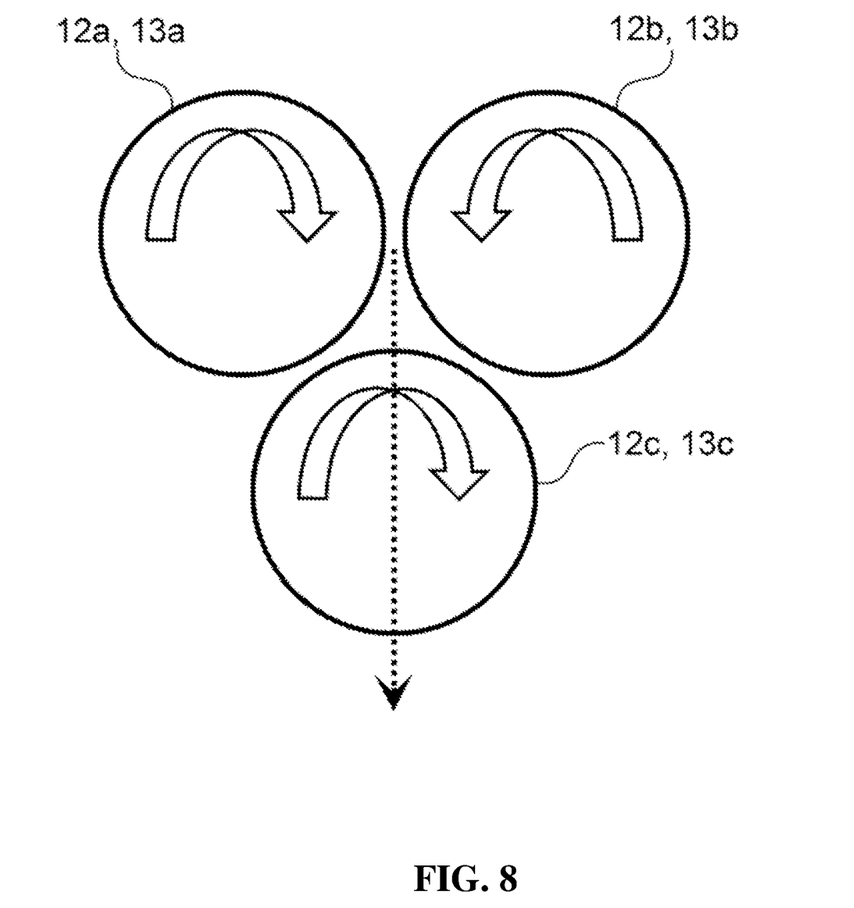
FIG. 8 is a view showing travel of the mobile robot moving backward along the straight route according to an embodiment of the present invention.

FIG. 7 is a view showing travel of the mobile robot moving forward along the straight route according to an embodiment of the present invention; and FIG. 8 is a view showing travel of the mobile robot moving backward along the straight route according to an embodiment of the present invention.

FIG. 7 shows an example in which the third rotary member 12c rotates in a counterclockwise direction. However, the mobile robot 10 may move forward along the straight route even when the third rotary member 12c rotates in a clockwise direction.

In addition, FIG. 8 shows an example in which the third rotary member 12c rotates in the clockwise direction. However, the mobile robot 10 may move backward along the straight route even when the third rotary member 12c rotates in the counterclockwise direction.

The description above describes the method for controlling a mobile robot according to another embodiment of the present invention with reference to FIGS. 6 to 8 under the assumption that the same load is applied to each of the first and second rotary members 12a and 12b.

Hereinafter, the description describes a method for controlling the mobile robot 10 to maintain the straight route in detail with reference to FIGS. 9 and 10 in a case where the mobile robot 10 according to an embodiment of the present invention deviates from the straight route or the loads each applied to the first and second rotary members 12a and 12b are different from each other while the mobile robot travels forward or backward along the straight route.

Figure 9:
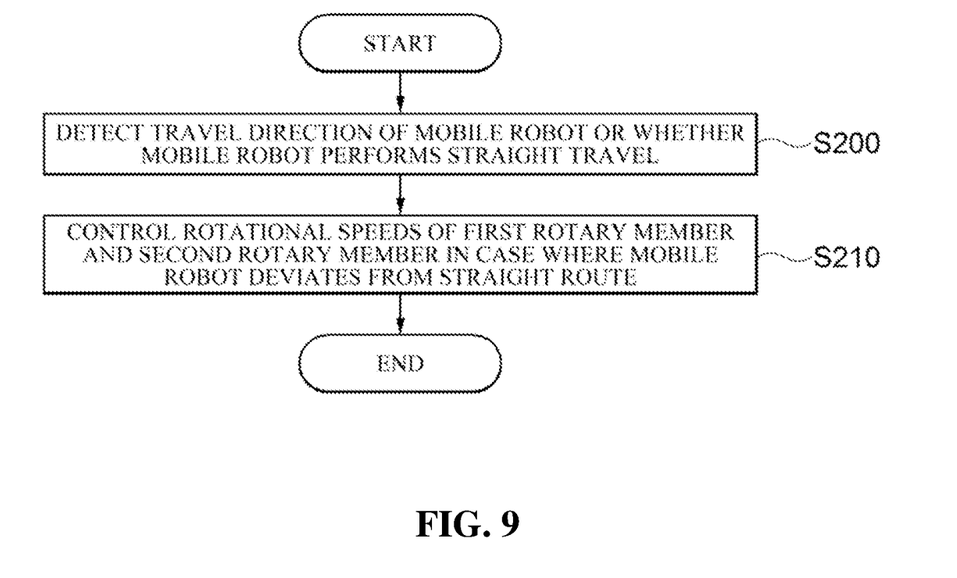
FIG. 9 is a flowchart showing a method for controlling a mobile robot according to yet another embodiment of the present invention.

FIG. 9 is a flowchart showing the method for controlling a mobile robot according to yet another embodiment of the present invention. The method for controlling a mobile robot according to yet another embodiment of the present invention may be implemented in the mobile robot 10 according to an embodiment of the present invention described with reference to FIGS. 1 to 5. Hereinafter, the description describes the method for controlling a mobile robot according to yet another embodiment of the present invention and an operation of the mobile robot 10 for implementing the method in detail with reference to the necessary drawings.

Referring to FIG. 9, the control unit 190 may detect the travel direction of the mobile robot 10 or whether the mobile robot 10 performs the straight travel during the travel of the mobile robot 10 [S200].

Step S200 may be performed using a signal output from the above-described direction detection unit 151.

The control unit 190 may control the rotational speed of at least one of the first rotary member 12a and the second rotary member 12b, depending on execution of step S200, for the mobile robot 10 to perform the straight travel in a case where the travel direction of the mobile robot 10 deviates from the straight route [S210].

Figure 10:
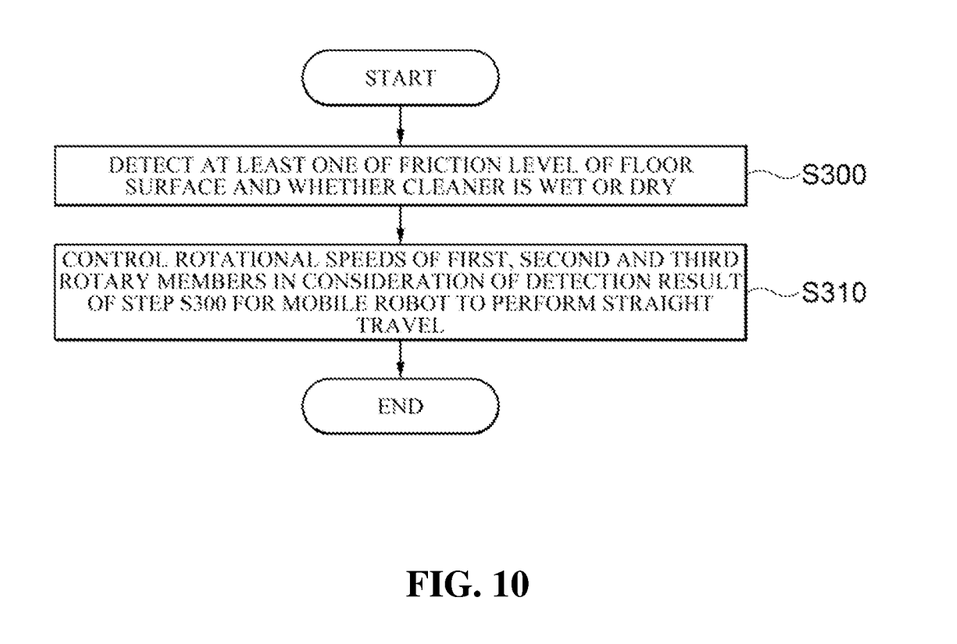
FIG. 10 is a flowchart showing a method for controlling a mobile robot according to still another embodiment of the present invention.

FIG. 10 is a flowchart showing a method for controlling a mobile robot according to still another embodiment of the present invention. The method for controlling a mobile robot according to still another embodiment of the present invention may be implemented in the mobile robot 10 according to an embodiment of the present invention described with reference to FIGS. 1 to 5. Hereinafter, the description describes the method for controlling a mobile robot according to still another embodiment of the present invention and an operation of the mobile robot 10 for implementing the method in detail with reference to the necessary drawings.

Referring to FIG. 10, the control unit 190 may detect at least one of the friction level of the floor surface and whether the cleaner is wet or dry during the travel of the mobile robot 10 [S300].

For example, the control unit 190 may determine the friction levels of the floor surface corresponding to the first rotary member and the floor surface corresponding to the second rotary member by controlling the load detection unit 150 to obtain the first load value applied to the first rotary member 12a and the second load value applied to the second rotary member 12b.

In addition, for example, the control unit 190 may detect whether the cleaner is wet or dry by a signal received from an external remote controller or detection of a predetermined color corresponding to each of the wet cleaner and the dry cleaner. The control unit 190 may control the rotational speed of at least one of the first, second and third rotary members 12a, 12b and 12c in consideration of a detection result of step S300 for the mobile robot 10 to travel along the straight route [S310].

For example, the control unit 190 may control the rotational speed of at least one of the first and second rotary members 12a and 12b) in consideration of the first load value and the second load value, obtained by the load detection unit 150, for the mobile robot 10 to travel along the straight route.

For example, when the first load value is greater, the control unit 190 may control the first driving unit 110a to increase the rotational speed of the first rotary member 12a.

In addition, for example, when the second load value is greater, the control unit 190 may control the second driving unit 110b to increase the rotational speed of the second rotary member 12b.

Meanwhile, the methods for controlling a mobile robot according to other embodiments of the present invention described above with reference to FIGS. 9 and 10 may be performed using a proportional-integral-differential (PID) control.

The methods for controlling a mobile robot according to various embodiments of the present invention described above may be implemented by a program and provided to a server or devices. Therefore, each apparatus may access the server or the device storing the program to download the program.

In addition, the method for controlling a mobile robot according to various embodiments of the present invention described above may be implemented by programs, and stored and provided in various non-transitory computer readable media. The non-transitory readable medium is not a medium that temporarily stores data, such as a register, a cache, a memory or the like, and indicates a medium that semi-permanently stores data and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, the read only memory (ROM) or the like.

Meanwhile, the functions of the various elements shown in the drawings of the present invention may be provided through use of dedicated hardware as well as hardware capable of executing software in relation to appropriate software.

Further, explicit use of the term "control unit" should not be construed as exclusively referring to the hardware capable of executing software, and may implicitly include, without limitation, a microprocessor (MCU), the digital signal processor (DSP) hardware, the read-only memory (ROM) to store the software, the random access memory (RAM) and the non-volatile memory.

In the claims of the present specification, an element represented as a means for performing a specific function encompasses any manner of performing the specific function, and this element may include any form of software, including a combination of circuit elements that perform the specific function or firmware, microcode or the like, combined with appropriate circuitry for executing software to perform the specific functions.

In the present specification, an expression 'an embodiment' of the principles of the present invention or the like, and various modifications of this expression are related to the corresponding embodiment and indicate that specific features, structures, characteristics or the like are included in at least one embodiment of the principles of the present invention.

Accordingly, the expression 'an embodiment' and any other modified examples throughout the present specification may not denote the same embodiment.

In a case where it is described in the present specification that a method includes a series of steps, a sequence of these steps suggested herein is not necessarily a sequence in which these steps may be executed. That is, any described step may be omitted and/or any other step that is not described herein may be added to the method.

In addition, unless explicitly described to the contrary, a singular form includes a plural form in the present specification. In addition, a component, step, operation and element, mentioned by terms 'include' or 'including' used in the present specification and may indicate the presence or addition of one or more other components, steps, operations, elements and devices.

Hereinabove, the description mainly describes the preferred embodiments of the present invention. All embodiments and conditional illustrations disclosed in the present specification have been described to intend to assist in the understanding of the principle and concept of the present invention by those skilled in the art to which the present invention pertains. Therefore, it will be understood by those skilled in the art that the present invention may be implemented in modified forms without departing from the spirit and scope of the present invention. Therefore, the embodiments disclosed herein should be considered in an illustrative aspect rather than a restrictive aspect.

The scope of the present invention should be defined by the claims rather than the above-mentioned description, and equivalents to the claims should be interpreted to fall within the present invention.

The invention claimed is:

1. A mobile robot comprising:
a main body;
a driving unit installed on the main body and configured to supply power for a travel of the mobile robot;
a first rotary member, a second rotary member and a third rotary member, capable of accommodating respective cleaners and providing moving power sources for the travel of the mobile robot by performing respective rotational motions about a first rotation axis, a second rotation axis and a third rotation axis by power of the driving unit; and
a controller configured to control the driving unit for the first rotary member having a first rotational speed and the second rotary member having a second rotational speed to rotate at same speed in opposite directions and for the third rotary member having a third rotational speed to rotate in same direction as one of a first rotation direction of the first rotary member or a second rotation direction of the second rotary member, wherein the third rotational speed is at least 10% of the first rotational speed or the second rotational speed,
wherein the first rotation axis corresponding to the first rotary member and the second rotation axis corresponding to the second rotary member are each inclined to have a predetermined angle with respect to a central axis, corresponding to a vertical axis of the mobile robot, for and the first rotary member and the second rotary member to each have are each disposed to be at an angle with respect to a ground surface,
wherein the central axis is a Z-axis which is perpendicular to the ground surface to be cleaned which is a X-Y plane defined by X and Y axes, and
wherein the third rotation axis corresponding to the third rotary member is parallel to the central axis for the third rotary member to be parallel to the ground surface.

2. The mobile robot of claim 1, wherein the controller is further configured to control at least one of the first rotational speed and the second rotational speed for the mobile robot to maintain a straight route in a case where the mobile robot deviates from the straight route during the travel of the mobile robot.

3. The mobile robot of claim 2, further comprising a detection unit capable of detecting a travel direction of the mobile robot or whether the mobile robot performs a straight travel,
wherein the controller is further configured to control any one of the first rotational speed and the second rotational speed for the mobile robot to perform the straight travel based on a signal of the detection unit in the case where the travel direction of the mobile robot deviates from the straight route.

4. The mobile robot of claim 3, wherein the detection unit includes at least one of an acceleration sensor or a gyro sensor.

5. The mobile robot of claim 1, wherein the controller is further configured to control at least one of the first rotational speed, the second rotational speed and the third rotational speed in consideration of at least one of a friction level of a floor surface on which the mobile robot travels and whether the cleaner is wet or dry during the travel of the mobile robot.

6. The mobile robot of claim 5, wherein the controller is further configured to determine the friction levels of a first floor surface corresponding to the first rotary member and a second floor surface corresponding to the second rotary member by obtaining a first load value applied to the first rotary member and a second load value applied to the second rotary member.

7. The mobile robot of claim 6, wherein the controller is further configured to control at least one of the first rotational speed and the second rotational speed in consideration of the first load value and the second load value for the mobile robot to travel along a straight route.

8. The mobile robot of claim 5, wherein the controller is further configured to determine whether the cleaner is wet or dry based on a signal received from an external remote controller and detection of a predetermined color indicating whether the cleaner is wet or dry.

9. The mobile robot of claim 1, wherein the predetermined angle includes a first angle of the first rotation axis and a second angle of the second rotation axis, and the first angle and the second angle are different from each other.

10. A method for controlling a mobile robot using rotational forces of a plurality of rotary members as moving power sources for its travel, the method comprising:
allowing a mobile robot to travel by rotating at least one of a first rotary member, a second rotary member and a third rotary member, capable of accommodating respective cleaners and performing respective rotational motions about a first rotation axis, a second rotation axis and a third rotation axis; and
controlling the first, second and third rotary members for the first rotary member have a first rotational speed and the second rotary member having a second rotational speed to rotate at same speed in opposite directions and for the third rotary member having a third rotational speed to rotate in same direction as one of a first rotation direction of the first rotary member or a second rotation direction of the second rotary member, wherein the third rotational speed is at least 10% of the first rotational speed or the second rotational speed,
wherein the first rotation axis corresponding to the first rotary member and the second rotation axis corresponding to the second rotary member are each inclined to have a predetermined angle with respect to a central axis, corresponding to a vertical axis of the mobile robot, for the first rotary member and the second rotary member to each have an angle with a ground surface,
wherein the central axis is a Z-axis which is perpendicular to the ground surface to be cleaned which is a X-Y plane defined by X and Y axes,
wherein the third rotation axis corresponding to the third rotary member is parallel to the central axis for the third rotary member to be parallel to the ground surface, and
wherein the first, second and third rotation axes are positioned adjacent to each other, resulting in the first, second and third rotary members being positioned close to each other.

11. The method of claim 10, further comprising controlling at least one of the first rotational speed and the second rotational speed for the mobile robot to maintain a straight route in a case where the mobile robot deviates from the straight route during the travel of the mobile robot.

12. The method of claim 10, further comprising:
obtaining a first load value applied to the first rotary member and a second load value applied to the second rotary member during the travel of the mobile robot; and
controlling at least one of the first rotational speed and the second rotational speed for the mobile robot to maintain a straight route in a case where a difference between the first load value and the second load value is greater than a predetermined value.

13. The method of claim 12, wherein the controlling includes controlling at least one of the first rotational speed, the second rotational speed and the third rotational speed in consideration of at least one of a friction level of a floor surface on which the mobile robot travels and whether the cleaner is wet or dry during the travel of the mobile robot.

14. A computer program stored in a non-transitory recording medium to execute the method of claim 10 by using a computer.

15. A distribution server for distributing the computer program of claim 14.

* * * * *